United States Patent
Fishman et al.

(10) Patent No.: US 6,819,704 B2
(45) Date of Patent: Nov. 16, 2004

(54) INDUCTION MELTING FURNACE WITH METERED DISCHARGE

(75) Inventors: Oleg S. Fishman, Maple Glen, PA (US); Hans G. Heine, Wildwood Crest, NJ (US); Joseph T. Belsh, Mount Laurel, NJ (US)

(73) Assignee: Inductotherm Corp., Rancocas, NJ (US)

( * ) Notice: Subject to any disclaimer, the term of this patent is extended or adjusted under 35 U.S.C. 154(b) by 0 days.

(21) Appl. No.: 10/624,163

(22) Filed: Jul. 21, 2003

(65) Prior Publication Data

US 2004/0017838 A1 Jan. 29, 2004

Related U.S. Application Data

(62) Division of application No. 10/200,358, filed on Jul. 22, 2002, now Pat. No. 6,600,768.
(60) Provisional application No. 60/307,200, filed on Jul. 23, 2001, and provisional application No. 60/352,979, filed on Jul. 30, 2002.

(51) Int. Cl.$^7$ ................................................ H05B 6/02
(52) U.S. Cl. ........................ 373/138; 373/140; 373/142
(58) Field of Search .................... 373/42, 43, 138–142, 373/146, 150, 151, 154, 159, 166; 219/660, 662, 666, 671; 75/10.14, 403; 266/45, 239, 240; 307/11, 17, 31

(56) References Cited

U.S. PATENT DOCUMENTS

| | | | | |
|---|---|---|---|---|
| 2,570,311 A | * | 10/1951 | Bohnet et al. | ............... 373/150 |
| 3,991,263 A | * | 11/1976 | Folgero et al. | ............. 373/140 |
| 5,222,096 A | * | 6/1993 | Reuter | ......................... 373/138 |
| 5,304,230 A | * | 4/1994 | Steins et al. | ................ 373/140 |
| 5,559,827 A | * | 9/1996 | Shimada et al. | ............ 373/142 |
| 6,596,221 B1 | * | 7/2003 | Fuchs | ......................... 373/142 |

* cited by examiner

Primary Examiner—Tu Hoang
(74) Attorney, Agent, or Firm—Philip O. Post

(57) ABSTRACT

An induction melting furnace comprises a melt chamber for heating a melt either directly by magnetic induction, or indirectly by magnetic induction heating of the melt chamber, or a combination of the two, and a meter chamber connected to the melt chamber for providing a metered discharge of the melt from the furnace. A gas can be injected into the furnace to provide a blanket over the surface of the melt in the melt chamber and a pressurized flush of the metered discharge of the melt from the meter chamber.

13 Claims, 8 Drawing Sheets

INDUCTION MELTING FURNACE WITH METERED DISCHARGE

CROSS REFERENCE TO RELATED APPLICATIONS

This application is a division of U.S. application Ser. No. 10/200,358, filed Jul. 22, 2002, now U.S. Pat. No. 6,600,768 which claims the benefit of U.S. Provisional Application No. 60/307,200, filed Jul. 23, 2001, and U.S. Provisional Application No. 60/352,979 filed Jan. 30, 2002, the entirety of each of which are incorporated herein by reference.

FIELD OF THE INVENTION

The present invention generally relates to electric induction melting furnaces, and more particularly to a multi-chamber furnace wherein a molten composition, or melt, is heated and optionally melted in a first chamber, and a metered quantity of the melt is discharged from a second chamber.

BACKGROUND OF THE INVENTION

Handling and melting a material that burns in the presence of oxygen, such as a magnesium based composition, presents special process control problems. For example, at around 435° C. (nominal incipient melt temperature) and above, molten magnesium reacts violently with air by combustion supported by oxygen in the air. At the same time, these types of alloys are finding increased use. For example, in the automotive industry, lightweight magnesium alloy components, die cast or otherwise produced, provide a lighter vehicle with a higher fuel economy.

Early induction melting of magnesium alloys was typically accomplished in an induction furnace of the type illustrated in FIG. 1. Furnace 100 comprises a crucible 102, thermal insulation 103, induction coils 104a, 104b and 104c, magnetic shunt assembly 108, and tilting mechanism 110. Crucible 102 was formed from a material that would not chemically react with the molten magnesium alloy 112 in the crucible. An open space 114 was provided between crucible 102 and thermal insulation 103 to allow for the drainage of any molten material that might leak from the crucible. The leakage could be removed from the furnace by removing plug 116 and draining the material. Coils 104a, 104b and 104c were individually controlled, and were powered from a utility source operating at 50 or 60 Hertz. The general configuration of the interior of the cylindrical crucible was a relatively large height and a small diameter since magnetic coupling of the field generated by current flowing in the coils was mainly with the crucible 102, although some magnetic flux penetrated into the molten magnesium alloy (melt) to provide a relatively small amount of direct induction heating and magnetic stirring of the melt. However, most heating of the melt was accomplished by conduction from the inductively heated crucible 102. Coils 104a, 104b and 104c were selectively energized on the basis of the height of the melt in the crucible at any given time. Magnesium alloy billets were used as feedstock for the furnace and lowered into the melt by a suitable transport system. The furnace operated as a hot heel furnace in which a minimum amount (heel) of molten magnesium alloy was always left in the crucible to facilitate the conduction heating of a billet that was added to the crucible. As mentioned above, molten magnesium reacts violently with oxygen in the air. Consequently, either a cover flux or protective atmosphere was placed over the exposed surface of the melt. Cover fluxes are low melting mixtures of salts that melt and flow over the surface of the melt to form a film that reduces vaporization and oxidation. However, fluxes create a corrosive atmosphere and can cause corrosion problems in castings that are poured from the molten magnesium alloy. Protective atmospheres are generally mixtures of air with sulfur dioxide, or carbon dioxide and/or sulfur hexafluoride, and are commonly used to modify the oxide film formed on the surface of the melt to suppress vaporization and further oxidation. As an alternative to using a protective atmosphere to form a surface oxide coating, an inert gas, such as argon or helium (provided that the protective volume is enclosed for this lighter than air gas), can be used to prevent magnesium from burning by excluding air from the surface of the melt. Tilting mechanism 110 was used to pour the melt from the crucible for casting. The pour, and also the addition of feedstock billets, must be very carefully performed to minimize disturbance of the protective flux or atmosphere that is provided over the surface of the melt in the crucible. In an alternative method for tapping the melt, a siphon tube is immersed in the melt to draw a volume of molten magnesium alloy for a casting pour. However, the siphon tube process requires penetration of the melt's surface. Further, the weight of the tube and the melt contained in the siphon presents a significant handling task in movement of the tube from within the melt to a receptacle in which the melt is released.

U.S. Pat. No. 5,908,488 (the 488 patent), entitled Magnesium Melting Furnace and Method for Melting Magnesium, illustrates another approach to melting and pouring magnesium for a casting operation. The furnace (1) in the 488 patent, which is configured to operate as a combustion furnace, comprises a horizontally oriented multi-chambered furnace consisting of a melting chamber (2), a holding chamber (4) and a meter chamber (6). Magnesium feedstock is added to the melting chamber in which it melts and flows to the holding chamber. In the holding chamber, impurities filter out of the melt and the magnesium melt flows to the meter chamber. A protective atmosphere of an air/sulfur hexafluoride mixture is used over the surfaces of the melt in the chambers. A mechanical metering pump (27) lifts molten metal out of the meter chamber and into a transfer pipe (28) that transfers the melt to a die casting machine or a transport container. The mechanical metering pump represents an improvement over pouring or siphoning the molten magnesium from the furnace but introduces a mechanical component that is subjected to a harsh operating environment and is largely recognized as practically ineffective, expensive, unreliable and, consequently, in need of frequent maintenance.

It is an object of the present invention to provide an induction furnace that will safely melt and heat molten metals, including molten metals that react violently with air, and provide a metered draw of the melt from the furnace in a clean and efficient manner.

BRIEF SUMMARY OF THE INVENTION

In one aspect, the present invention is an apparatus for, and method of, heating a melt in a furnace and providing a metered discharge of the melt from the furnace. The furnace comprises a melt chamber and a meter chamber that are interconnected by a passage.

In one example of the invention, a melt chamber stopper means can either allow or inhibit flow of the melt between the melt and meter chambers through the connecting passage. In another example of the invention, a valve is used to either allow or inhibit flow of the melt between the melt and meter chambers through the connecting passage. In one example of the invention, a meter chamber stopper means can either allow or inhibit flow of a metered discharge of the melt from the furnace. In another example of the invention, a valve is used to either allow or inhibit flow of a metered discharge of the melt from the furnace.

In one example of the present invention, a meter chamber stopper rod that is connected to the meter chamber stopper means is disposed within a melt chamber stopper rod that is connected to the melt chamber stopper means, and the space between the meter chamber stopper rod and melt chamber stopper rod provides a flow path for a gas that is injected into the melt in the furnace. When the furnace is in the heating state, flow of melt between the melt and meter chambers is allowed, and flow of a metered discharge of the melt from the furnace is inhibited. In this state, the injected gas bubbles through the melt in the melt chamber to the space above the surface of the melt in the melt chamber where it collects to form a protective gas blanket over the melt from oxygen in the air. When, the furnace is in the metered discharge state, flow of melt between the melt and meter chambers is inhibited, and flow of a metered discharge of the melt from the furnace is allowed. In this state, the injected gas flows into the meter chamber to flush the metered volume of melt from the chamber.

In the example of the present invention wherein valves are used to control the flow of the melt, gas is injected into the melt chamber and meter chamber by a controlled gas supply system. Means for supplying feedstock to the melt chamber are also provided. Other aspects of the invention are set forth in this specification and the appended claims.

BRIEF DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
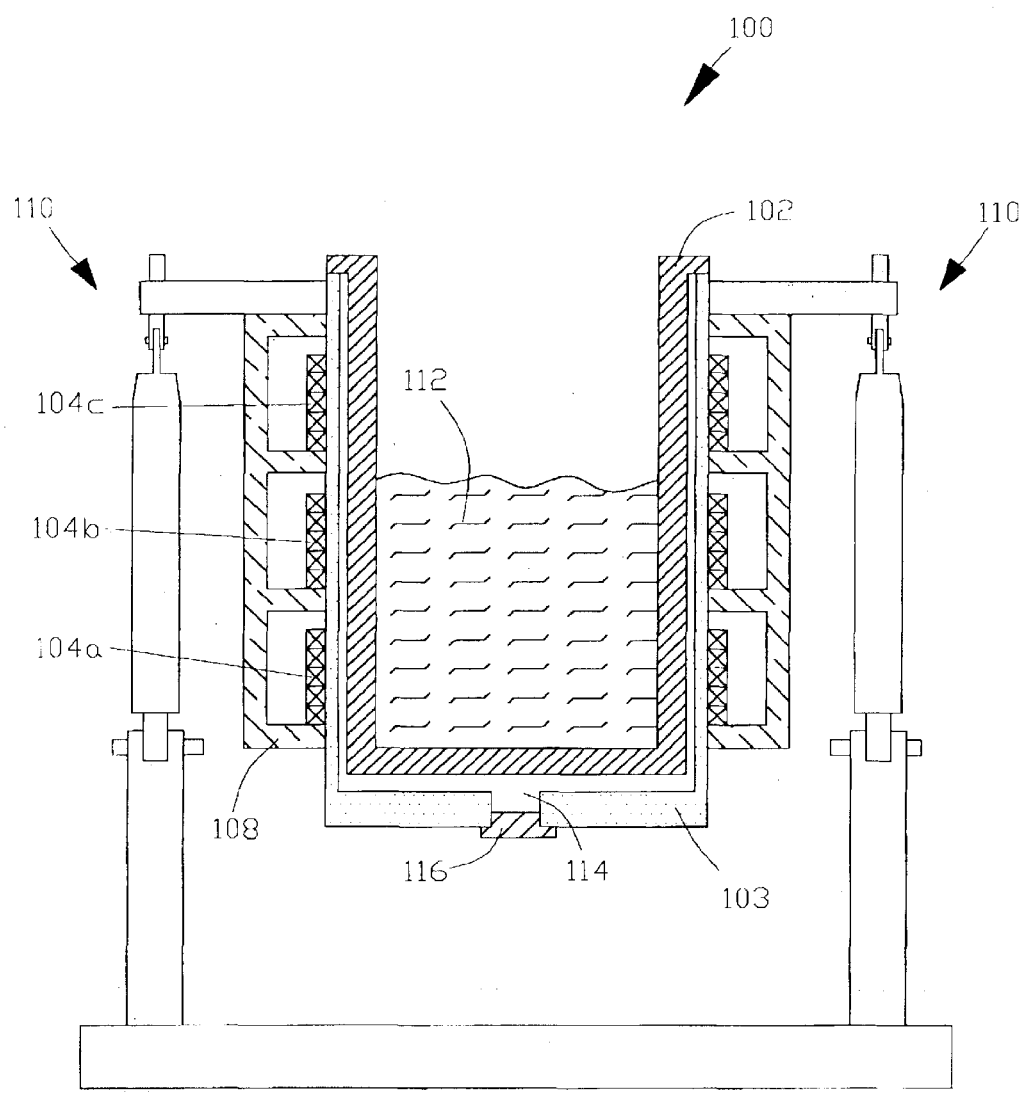
FIG. 1 is a cross sectional view of a prior art induction furnace that is of particular use in melting magnesium alloys.
Figure 2:
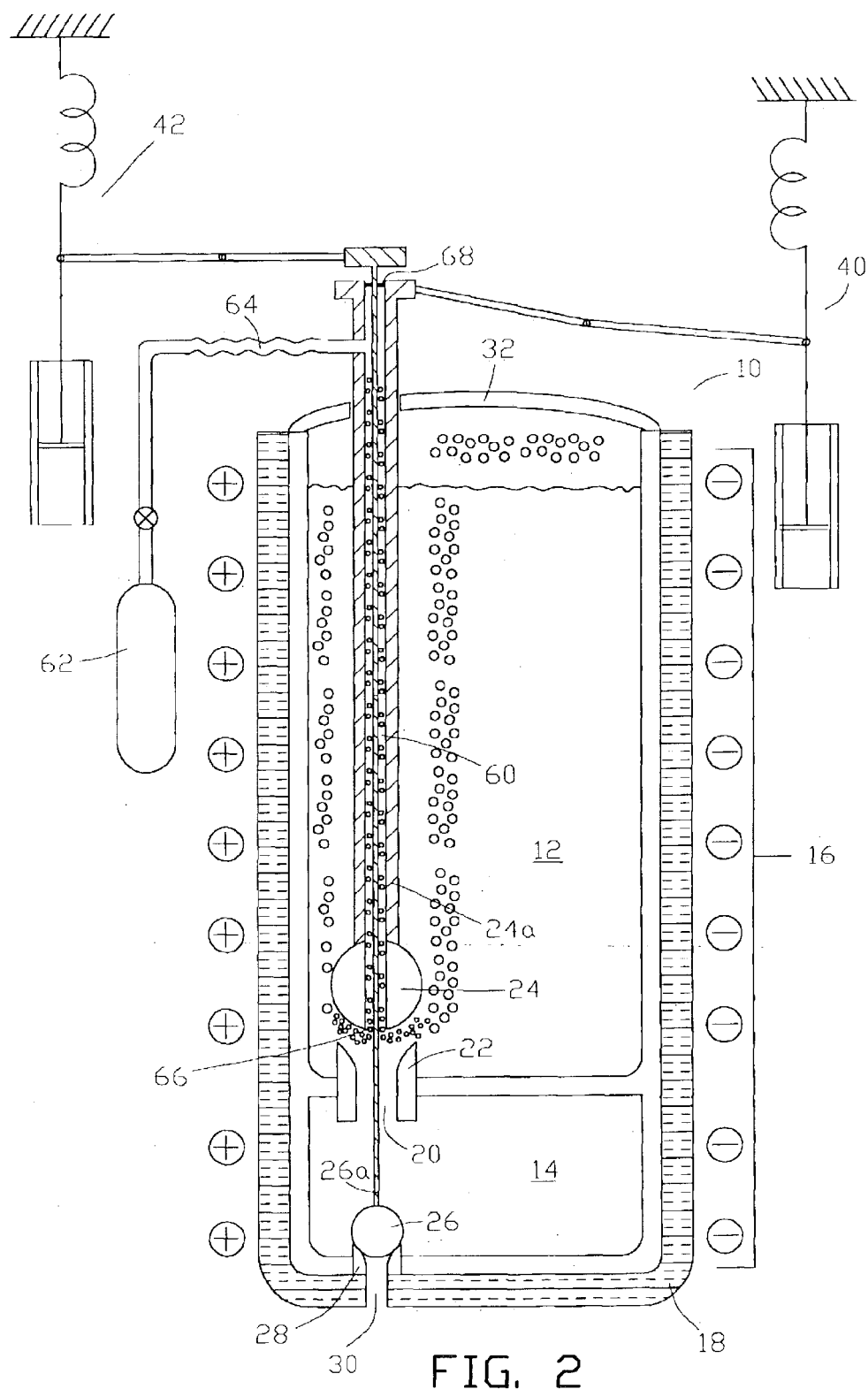
FIG. 2 is a cross sectional view of one example of the induction melting furnace of the present invention with the connecting passage between the melt and meter chambers open and the outlet passage from the meter chamber closed.
Figure 3:
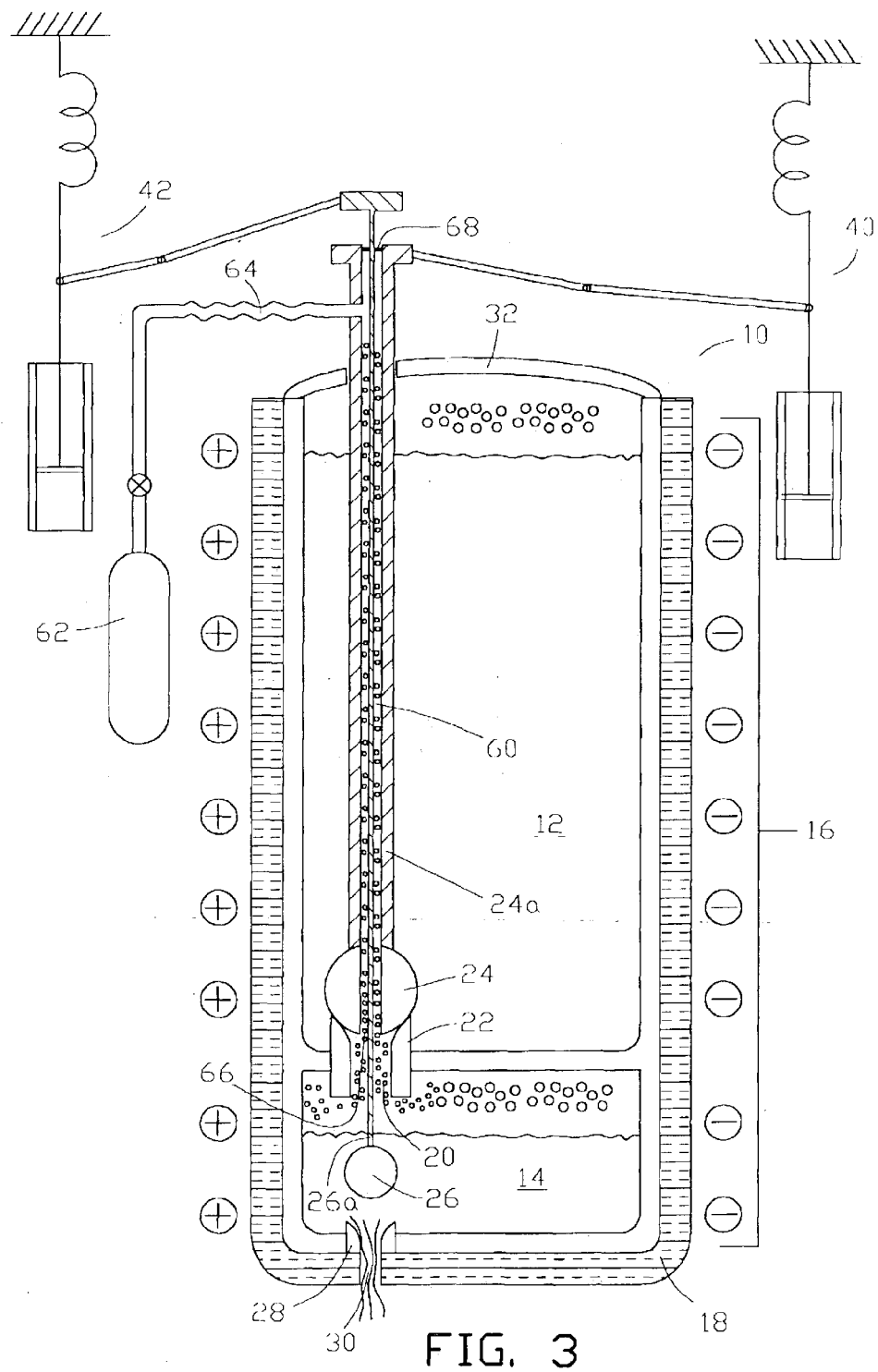
FIG. 3 is a cross sectional view of one example of the induction melting furnace of the present invention with the connecting passage between the melt and meter chambers closed and the outlet passage from the meter chamber open.

Referring now to the drawings, wherein like numerals indicate like elements there is shown in FIG. 2 and FIG. 3 one example of an induction melting furnace 10 of the present invention. The furnace comprises two chambers, namely melt chamber 12 and meter chamber 14. When the melt is a magnesium based alloy, such as the general casting magnesium alloy AZ91, one suitable non-reacting material for the chambers is a stainless steel, which is also an electrically conductive material. Induction coil 16 is disposed around the furnace. The coil is connected to a suitable ac power source (not shown in the drawings) so that the magnetic field generated from ac current flowing through the coil inductively heats the melt chamber and the meter chamber, when they are constructed of electrically conductive material, and/or inductively heats the melt when it is an electrically conductive material. In examples wherein the material of a chamber is electrically conductive, the chamber is inductively heated, and the induced heat is conducted into the melt to heat the melt. For a melt such as a magnesium based alloy, an appreciable amount of the induced heating is in the chamber material, although there is also some induced heating of the melt. In other examples of the invention, most, if not all, induced heating may occur in the melt when the melt is an electrically conductive material, and the chambers are constructed from non-electrically conductive materials. The illustrated configuration of the furnace is a non-limiting example of a suitable two-chamber furnace for practicing the invention. A layer of thermal insulation 18, such as an air-bubbled ceramic composition, can be placed around the exterior of the furnace to retain heat within the furnace. The layer may also serve as an electrical insulator between the furnace and the coil. In some embodiments, the induction coil may consist of multiple induction coils, some of which may be connected to an adjustable frequency power source to provide time and intensity variable heating zones and/or electromechanical stirring of the melt in either or both chambers. Additionally one or more induction coils may partially surround regions of the melt chamber and/or the meter chamber, and be powered from one or more suitable power supplies. The coils may be air-cooled or water-cooled, and may consist of solid or stranded conductors configured in what is commonly known as Litz wire.

Interconnecting passage 20 is provided between the melt and meter chambers. In this non-limiting example, the passage is formed by melt chamber nozzle 22. The walls of melt chamber nozzle 22 rise above the base of melt chamber 12 to assist in preventing settled particulate from flowing into the meter chamber through passage 20. Filter screens or other filtering means may be provided to serve a similar function.

As shown in FIG. 2, melt chamber stopper 24 (spherically shaped in this non-limiting example) is in the raised position to allow free transfer of the melt through passage 20, and the free transfer of circulation heat in the melt throughout the two chambers. In FIG. 2, meter chamber stopper 26 (also spherically shaped in this non-limiting example) is in the lowered position to seat on meter chamber nozzle 28, which prevents discharge of melt from the meter chamber through outlet passage 30. In this non-limiting example, meter chamber nozzle 28 is of similar construct as melt chamber nozzle 22. Meter chamber stopper rod 26a is disposed within melt chamber stopper rod 24a. Volume 60 defines a space between the melt chamber stopper rod and meter chamber stopper rod that forms a path for gas from gas supply 62 via connecting element 64. A non-limiting choice of gas is an inert gas, such as argon. Either the gas supply and associated connecting element 64 are commonly mounted with melt chamber stopper rod 24a so that it travels with the motion of the stopper rod, or a flexible connecting element 64 is provided to allow travel of the stopper rod while the gas supply remains fixed. Sealing element 68 prevents the escape of gas to atmosphere from volume 60. Gas travels down volume 60 and exits into the melt chamber from the melt chamber stopper 24 at region 66. Gas is supplied at a pressure that is greater than the static pressure of the melt at region 66 so that the gas bubbles up through the melt in the melt chamber and collects over the surface of the melt. Lid 32 may be provided for greater retention of the gas over the surface of the melt. Generally, but not necessarily, the lid is not gas tight to avoid the build up of excessive gas pressures within the melt chamber. Alternatively venting may be accomplished with a sealed lid, appropriate vent conduit and control valve for venting the gas to atmosphere, or reclamation and recycling to the gas supply. If the melt burns in oxygen, such as a magnesium based composition, the layer of a non-oxygen containing gas, such as argon, will prevent ignition of the melt. Raising and lowering means 40 raises or lowers the melt chamber stopper rod and stopper, and raising and lowering means 42 raises or lowers the meter chamber stopper rod and stopper. The raising or lowering of the melt chamber stopper rod and stopper can be accomplished independently of the raising or lowering of the meter chamber stopper rod and stopper. Each raising and lowering means is diagrammatically shown as a weight and lever arrangement. In practice, any suitable drive system can be used as a stopper raising and lowering means.

FIG. 2 illustrates the melting and heating state of furnace 10. FIG. 3 illustrates the metered pour state of furnace 10. In FIG. 3, melt chamber stopper 24 is in the lowered position and seated on melt chamber nozzle 22 to inhibit flow of melt from melt chamber 12 into the meter chamber 14. Meter chamber stopper 26 is in the raised position to allow the discharge of a measured melt (based on the volume of the meter chamber) in the meter chamber through outlet passage 30 into a suitable container (not shown in the figure), such as a die casting apparatus, casting mold or ladle. In the metered pour state, gas releases from region 66 into meter chamber 14. The release of pressurized gas into the meter chamber flushes the melt in the meter chamber through outlet passage 30. Transition from the melting and heating state to the metered pour state is accomplished by first lowering melt chamber stopper 24 to seat on melt chamber nozzle 22, and then raising meter chamber stopper 26. Conversely, in transition from the metered pour state to the melting and heating state, meter chamber stopper 26 is lowered to seat on meter chamber nozzle 28, and then melt chamber stopper 24 is raised. Meter chamber stopper 26 represents one example of a means for controlling the flow of the melt through the connecting passage between the melt chamber and the meter chamber, and melt chamber stopper 24 represents one method of controlling the discharge of the melt through outlet passage 30.

Figure 4:
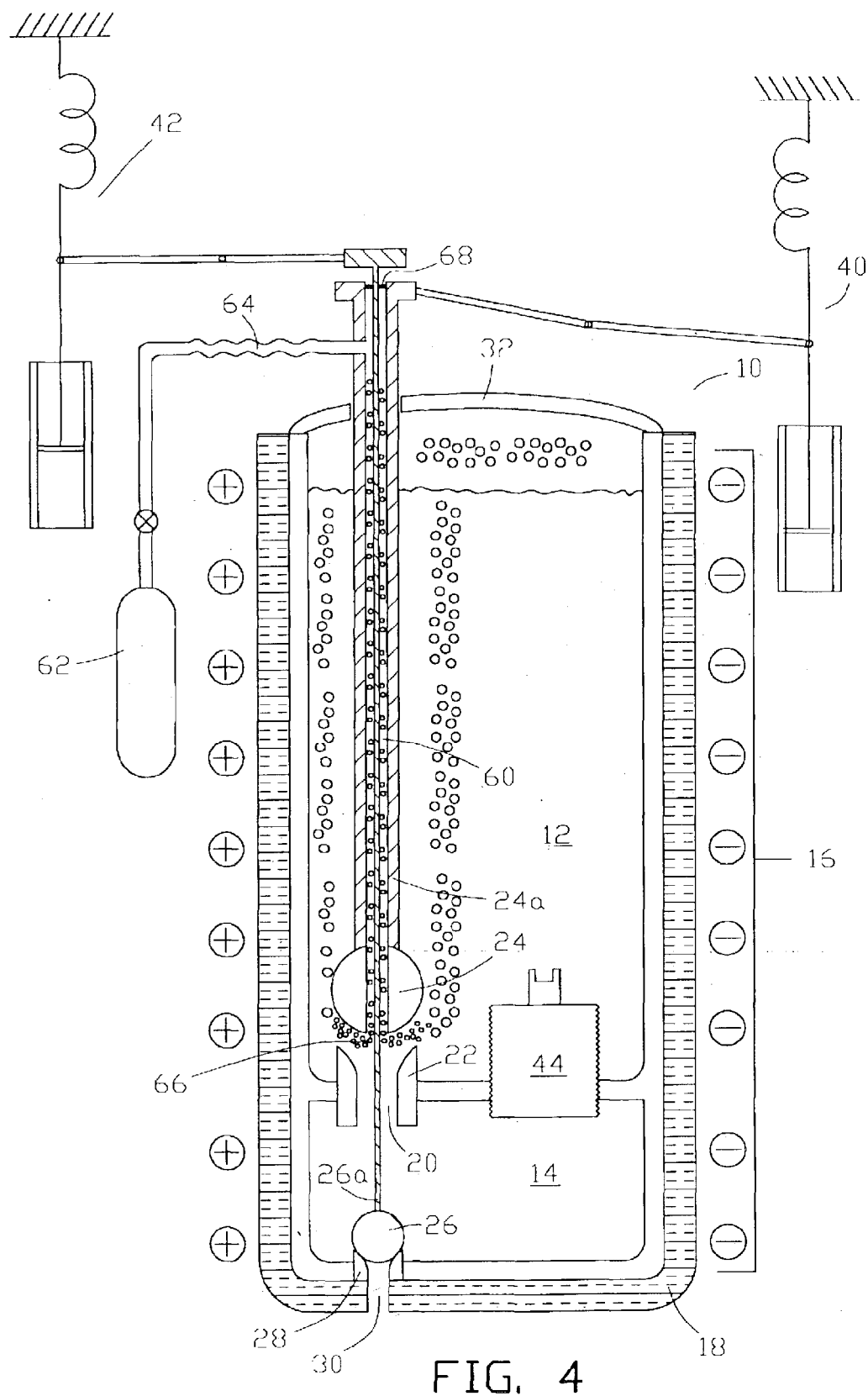
FIG. 4 is a cross sectional view of another example of the induction melting furnace of the present invention illustrating an optional meter chamber volume adjusting element.

FIG. 4 illustrates the use of an optional meter chamber volume adjusting element 44 that is integral with furnace 10 in this non-limiting example of the invention. By lowering chamber volume adjusting element 44 into meter chamber 14, the volume in meter chamber 14 is reduced. Conversely, by raising chamber volume adjusting element out of meter chamber 14, the volume in meter chamber 14 is increased. In this fashion, the metered discharge volume, or shot, of melt that is released from the meter chamber can be precisely controlled. In this non-limiting example, the meter chamber volume adjusting element 44 comprises a threaded plug that is seated in the boundary wall between the melt and meter chambers. The threaded connection forms a liquid tight seal between the two chambers. The plug may be raised or lowered, either manually or automatically, by a rotating control rod (not shown in the figure) that penetrates a furnace boundary, such as the base, wall or lid. The rod may be either permanently or temporarily installed in the furnace. Alternatively, a remotely controlled actuator can be installed on the volume adjusting element.

Figure 5:
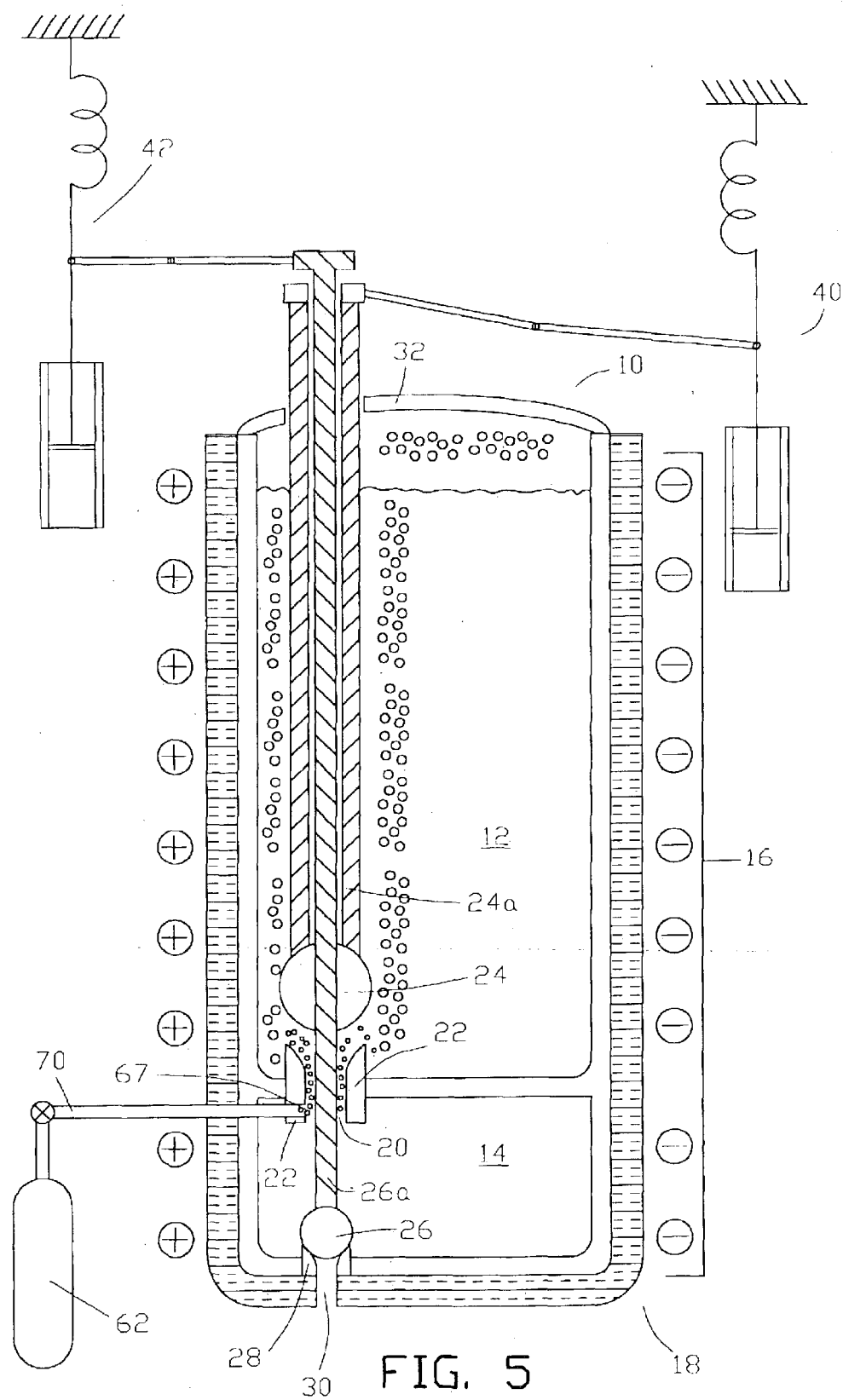
FIG. 5 is a cross sectional view of another example of the induction melting furnace of the present invention illustrating an alternate method of injecting a gas into the furnace.

FIG. 5 illustrates one alternative means of supplying gas to furnace 10. In this example, gas is provided by, gas supply 62 via connecting element 70 to melt chamber nozzle 22 (region 67) at a pressure greater than the static pressure of the melt in the nozzle. When melt chamber stopper 24 is in the raised position, gas bubbles up through the melt in the melt chamber. When melt chamber stopper 24 is in the lowered position gas flows into meter chamber 14. Other functions of the furnace are the same as those in the previous examples of the invention.

Figure 6:
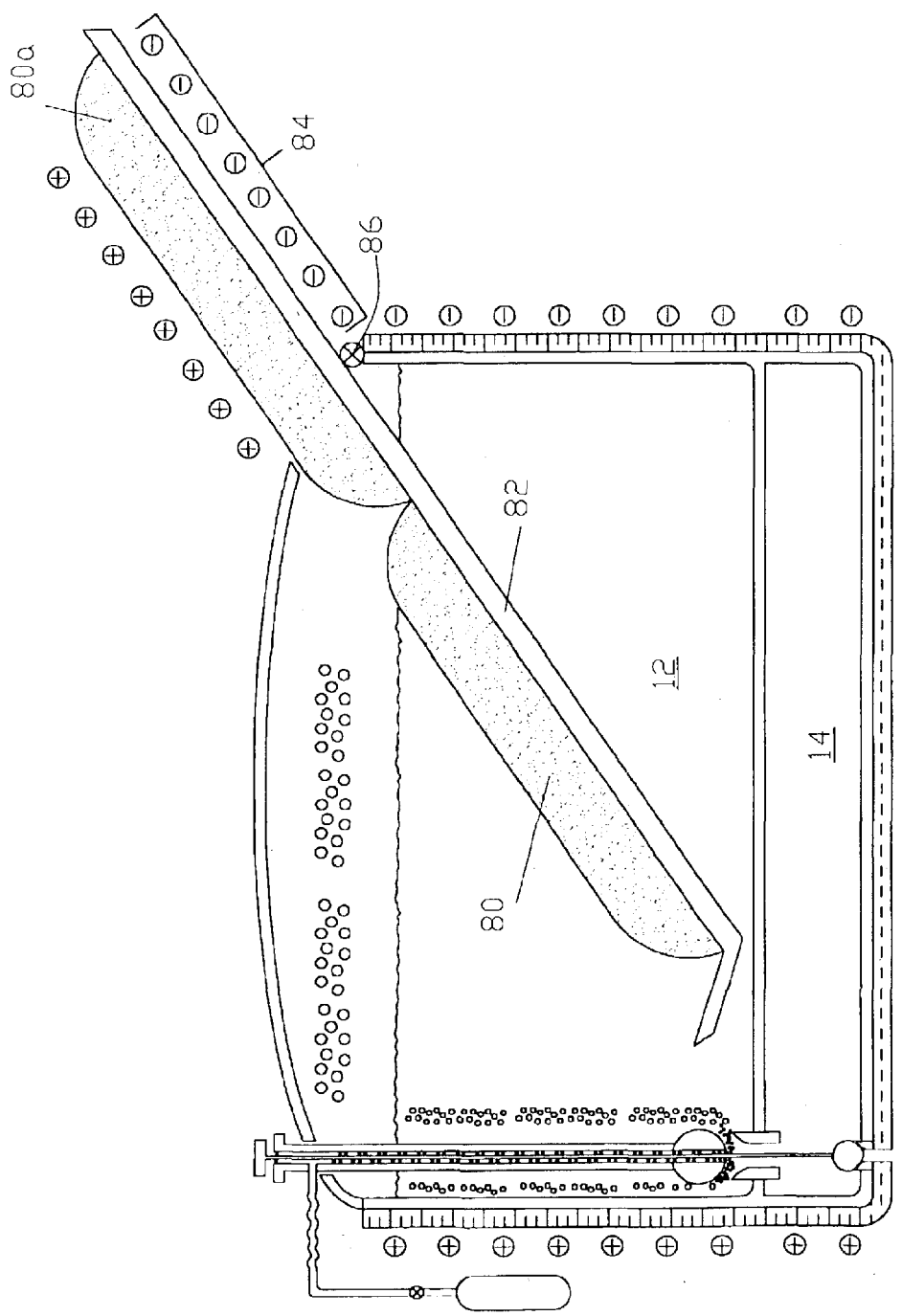
FIG. 6 is a cross sectional view of another example of the induction melting furnace of the present invention illustrating one example of a feedstock feeder for the furnace.
Figure 7:
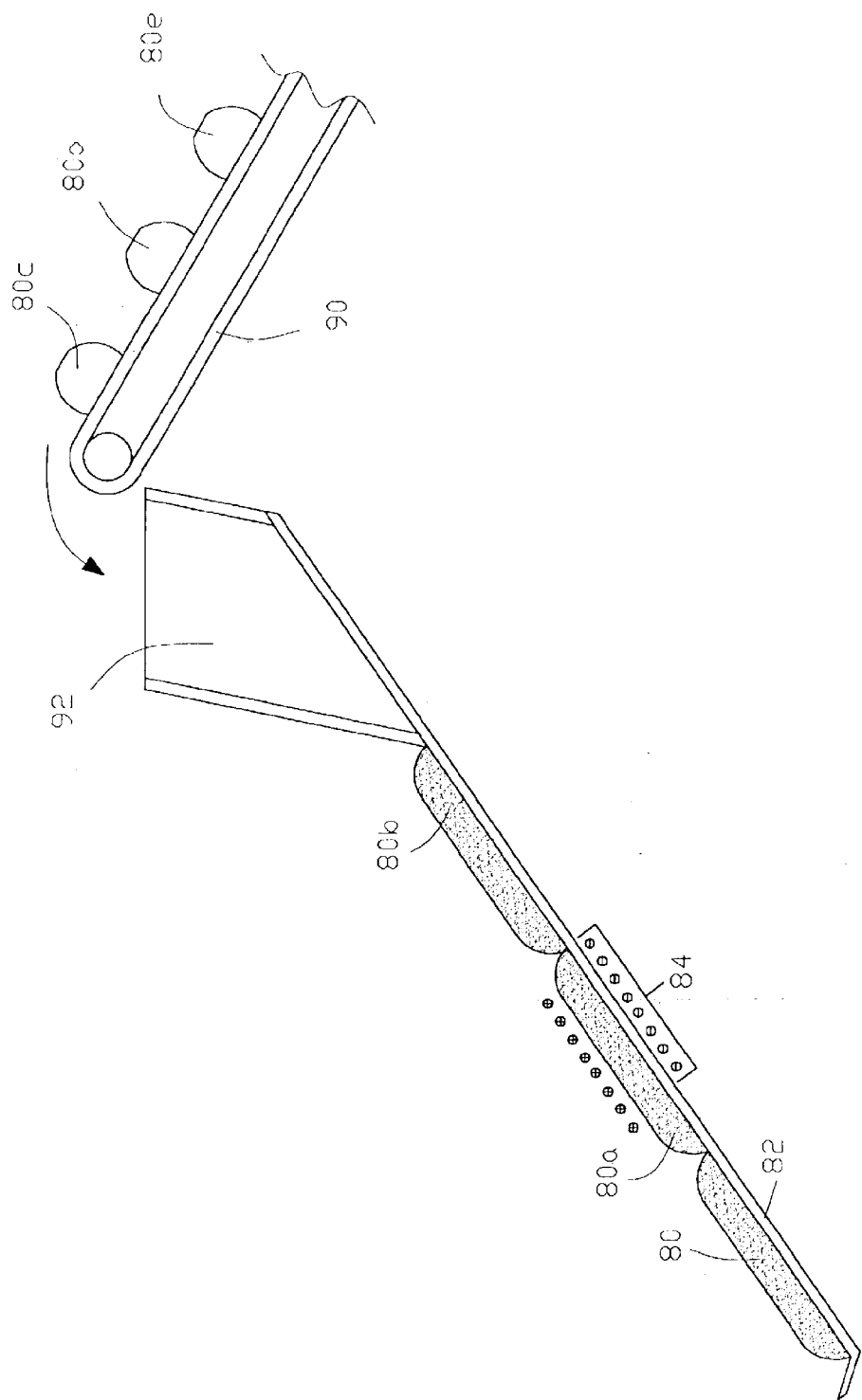
FIG. 7 is a cross sectional view of one example of a feedstock feeder and automated feedstock loader for one example of the induction melting furnace of the present invention.

FIG. 6 and FIG. 7 illustrate a means for providing a continuous supply of a feedstock to the melt chamber. FIG. 6 illustrates one non-limiting method of supplying the feedstock, in this example, billets, into melt chamber 12. Two billets, 80 and 80*a*, sit on feeder trough 82 which is tilted into the melt chamber to allow the lower billet 80 to be heated and melted into the melt in the melt chamber. As the lower billet melts, the upper billet 80*a* slides down trough 82 and is immersed in the melt and melts. An auxiliary induction coil 84 may be used to preheat the upper billet prior to immersion in the melt. Alternatively or in conjunction with the auxiliary coil, waste heat gas from the melt chamber can be channeled around the upper billet to preheat it. Trough 82 may be mounted on adjustable pivot 86 to allow for adjustment of the trough angle into the melt. For a trough angle (between the longitudinal length of the trough and the horizontal surface of the melt in the melt chamber) smaller than that shown in FIG. 6, less of the lower billet will be immersed in the melt, and therefore, the billet will melt at a lower rate. Adjustment of the trough angle will be related to the volume of a metered shot of melt from meter chamber 14. The larger the volume of the meter chamber, the greater the trough angle, since more feedstock must be melted in a given period of time to support a periodic shot of melt from the melt chamber.

FIG. 7 illustrates one method of automatically supplying new billets 80*c*, 80*d* and 80*e* to feeder trough 82. The lengths of these billets on conveyor means 90 are perpendicularly oriented to the lengths of billets 80, 80*a* and 80*b* on the feeder trough. A billet sensor means can be provided along feeder trough 82 to sense when billet 80 b has moved down trough 82 to the position of billet 80*a* in FIG. 7, after billet 80 has melted into the melt in the melt chamber, and billet 80*a* has moved to the position of billet 80 in FIG. 7. When the billet sensor means senses the aforesaid movement of billets, which leaves the position on trough 82 formerly occupied by billet 80*b* unoccupied, conveyor means 90 is activated to move new billet 80*c* to transition trough 92, which delivers billet 80*c* in the proper orientation to the position on trough 82 formerly occupied by billet 80*b*. In this manner, a continuous feed of billet feedstock can be supplied to the furnace's melt chamber.

In other examples of the invention, feedstock may be supplied in alternative suitable forms, such as pre-melted liquid, slurry, or granules, with suitable delivery means for introducing the feedstock into the melt chamber.

Figure 8:
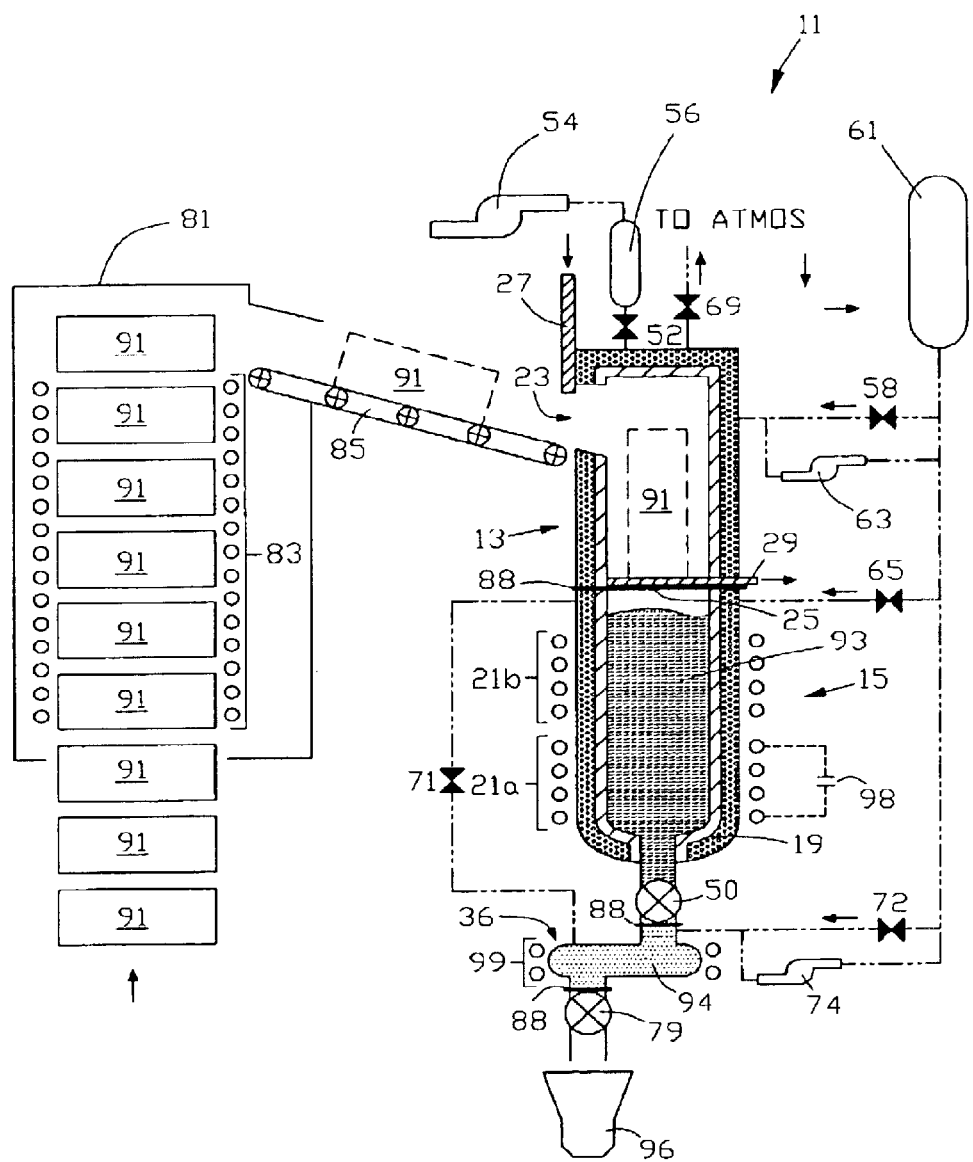
FIG. 8 is a cross sectional view of another example of the induction melting furnace of the present invention.

FIG. 8 represents another example of induction melting furnace 11 of the present invention. Induction furnace 11 includes air lock 13, melt chamber 15 and meter chamber 36. In this particular example, flanges 88 join the air lock to the melt chamber, and the melt chamber to the meter chamber. Suitable thermal insulation 19 may be provided around the melt chamber to retain heat in the interior of the chamber. Insulation may also be provided around the meter chamber.

One or more induction coils, 21a and 21b, at least partially surround the exterior of the melting chamber and are connected to one or more high frequency power supplies (not shown in the drawings). In one example of the invention, wherein the melt chamber is primarily induction heated (e.g., a stainless steel melt chamber) a power supply frequency of 3,000 Hertz is suitable. The thickness of the chamber wall is selected to optimize the inductive heating of the chamber from the magnetic field created by the flow of a high frequency current from a power supply through the one or more induction coils. The coils may be air-cooled or water-cooled, and may consist of solid or stranded conductors configured in what is commonly known as Litz wire. Generally, each coil is individually controlled so that current can be independently adjusted in each coil to reflect heating requirements along the height of the crucible. For example, if the height of melt 93 is only to the top of coil 21a rather than to the top of coil 21b as shown in FIG. 8, then coil 21b may be dc-energized while coil 21a operates somewhere in the range from half to full current. In one example of the invention, one of the two coils shown in FIG. 8 may be connected in parallel with a tuning capacitor to form a tank circuit that is passively energized by magnetic coupling with the field generated by current flowing in the other coil when it is connected to a suitable ac power supply. As illustrated in FIG. 8, tuning capacitor 98 is connected in parallel with coil 21a to form a passive tank circuit (dashed lines), while coil 21a is connected to a suitable ac power supply. AC current flow though coil 21a establishes a magnetic field that couples with passive coil 21b to induce a current flow in the passive tank circuit. This combination of passive tank coil and active coil results in an overall induction coil circuit with improved power factor. It will be appreciated that there are other configurations and variations of coil arrangements, with single or multiple coils, that can be used with the induction furnace of the present invention. For example, an orifice induction heater may be additionally provided at the outlet of the melt chamber near meter chamber melt inlet valve 50. Further the illustration of two coils in FIG. 8 is not intended to limit the invention to a two-coil configuration. Additionally, an induction coil may be provided around meter chamber 36 to inductively heat the meter chamber and/or the melt in the chamber as illustrated by coil 99 in FIG. 8.

Air lock 13 is a feed chamber that serves as a means for introducing new feedstock into the melt chamber 15 of the furnace illustrated in FIG. 8 without disturbing the controlled environment within the melt chamber as further described below. Feedstock for a magnesium alloy melt is a magnesium alloy in suitable solid or semi-solid form. For this example, the feedstock is in the form of billets 91, although the feedstock could be supplied in other configurations, such as spherical elements.

Preheater 81 is used to preheat billets 91 to a suitable temperature before injection into air lock 13. Preheating is done to achieve efficient melting of a billet in the melting chamber. Typically for a magnesium alloy billet, the billet is heated throughout to approximately 400° C., which is somewhat less than the incipient melt temperature of the alloy. For the example show in FIG. 8, the preheater is an induction oven. In other examples, the preheater may be a fossil-fuel fired oven. For the example shown in FIG. 8, the preheater utilizes a single induction coil 83. Other configurations of induction coils are contemplated within the scope of the invention. In one example, an induction coil is provided for each billet to accurately control the heating of each billet in the preheater. A conveyor means (not show in FIG. 8) is used to move the billets through the preheater. Upon demand for additional feedstock in the melting chamber, a billet is ejected from the preheater onto conveyor means 85 for transport through a sealable supply opening 23 (shown in the opened position in FIG. 8) in air lock 13. Once the opening 23 is sealed closed by, for example, lowering door 27, closed vacuum valve 52 opens to draw a vacuum inside of the sealed airlock. In the non-limiting configuration shown in FIG. 8, vacuum pump 54 draws a vacuum on tank 56 prior to the opening of vacuum valve 52 so that the vacuum draw in the air lock is quickly accomplished. After drawing a vacuum in the air lock, air lock gas supply valve 58 is opened to allow the flow of a gas from gas supply tank 61. A non-limiting choice of gas is argon. Once the sealed air lock has been flooded with argon to bring it to a pressure approximately equal to the pressure in the melt chamber, sealable delivery opening 25 is opened by, for example, sliding door 29 to the right, to allow a billet 91 (shown in dashed lines) placed in the air lock to enter melt chamber 15. The billet 91 will be heated and become a part of the melt in the melt chamber, which generally keeps melt 93 at a tap temperature (nominally 700° C. for a magnesium alloy) for a metered discharge from the furnace.

Furnace 11 in FIG. 8 operates as a hot heel furnace and always maintains at least a minimum amount of melt 93 inside the melt chamber. When sealable delivery opening 25 is closed (as shown in FIG. 8), melt chamber gas supply valve 65 supplies argon to the interior of the melting chamber above the surface of melt 93. After a billet 91 enters the melting chamber, sealable delivery opening 25 is closed and argon in the sealed air lock is recovered by the argon supply by evacuating the argon from the feed chamber with pump 63. After argon recovery, the interior of the air lock is vented to atmosphere by opening vent valve 69, and the air lock is ready for receipt of another billet via sealable supply opening 23.

Meter chamber melt inlet valve 50 and outlet valve 79 remain closed until there is a demand for a measured discharge (based on the volume of the meter chamber) of melt 94. When meter chamber 36 does not contain a measured discharge melt, it is normally filled with argon via opened meter chamber gas supply valve 72. When a demand for a measured discharge melt is made, meter chamber gas supply valve 72 closes; meter chamber inlet melt valve 50 opens and; alternatively, meter chamber gas exhaust valve 71 opens so that argon displaced by the melt entering the meter chamber flows into the argon volume above the surface of melt 93 in the melt chamber, or pump 74 evacuates argon from the meter chamber to the argon supply immediately before meter chamber melt inlet valve 50 opens. Once the meter chamber is filled, meter chamber melt inlet valve 50 closes and meter chamber melt outlet valve 79 opens to discharge a measured melt 94 into a suitable container 96, such as a die casting apparatus, casting mold or ladle. After emptying the measured discharge melt 94 from meter chamber 36, argon is injected back into the meter chamber by opening closed meter chamber gas supply valve 72 to ready the meter chamber for receipt of another measured discharge melt.

Meter chamber 36 can be fabricated from stainless steel when the melt is a magnesium alloy. Flanges 88 are provided for the inlet and outlet of meter chamber 36 as a convenient means for interchanging meter chambers of varying volumes in furnace 11. In this manner, the furnace can efficiently accommodate containers 96 of varying sizes by discharging an amount of melt that is appropriate for the volume of a particular container.

Summarizing the overall operation of loading a billet 91 into furnace 11, as illustrated in FIG. 8, with the following initial conditions:

| Element | Condition |
| --- | --- |
| Sealable supply opening 23 | Opened |
| Sealable delivery opening 25 | Closed |
| Vacuum valve 52 | Closed |
| Vent valve 69 | Closed |
| Air lock gas supply valve 58 | Closed | the following steps occur:

billet 91 is injected into air lock 13;

sealable supply opening 23 is closed to seal the interior of the air lock;

vacuum valve 52 opens to draw a vacuum in the air lock;

air lock gas supply valve 58 opens to inject argon into the air lock to bring the interior of the air lock to approximately the same pressure as the pressure in the melt chamber;

sealable delivery opening 25 is opened to allow billet 91 to enter melt chamber 15;

sealable delivery opening 25 is closed after billet 91 has been deposited in the melt chamber;

gas pump 63 reclaims argon from the interior of the air lock to the argon supply (alternatively, this step may be omitted and the argon can be vented to atmosphere in the following step); and gas vent valve 69 opens to bring the inside of the air lock to atmospheric pressure so that sealable supply opening 23 can be reopened for receiving another billet.

Summarizing the overall operation of discharging a metered discharge melt from furnace 11 with the following initial conditions:

| Element | Condition |
| --- | --- |
| Meter chamber melt inlet valve 50 | Closed |
| Meter chamber melt outlet valve 79 | Closed |
| Meter chamber gas supply valve 72 | Opened |
| Meter chamber gas exhaust valve 71 | Closed | the following steps occur:

meter chamber gas supply valve 72 closes to terminate supply of argon to meter chamber 36;

alternatively, meter chamber gas exhaust valve 71 opens to allow argon displaced by the filling of the meter chamber with melt to flow into the volume above the melt in the melt chamber, or pump 74 is used to evacuate argon from the meter chamber to the argon supply;

meter chamber melt inlet valve 50 opens to allow melt to fill the meter chamber;

meter chamber melt inlet valve 50 closes after the meter chamber is filled;

meter chamber melt outlet valve 79 opens to release the metered discharge melt 94 into a suitable container;

meter chamber gas exhaust valve 71 closes and meter chamber gas supply valve 72 opens to supply argon to the meter chamber as the metered discharge melt leaves the meter chamber; and meter chamber melt outlet valve 79 closes after the release of the metered discharge melt and the meter chamber is ready for the receipt of melt from the melt chamber.

While the above examples generally describes the melting and discharge of a molten magnesium alloy, the induction furnace with metered discharge of the present invention has applications within the scope of the invention for use with other materials by making appropriate modifications as known by one skilled in the art. Further an artisan will appreciate that the supporting vacuum system, protective air supply system, selection of the configuration of furnace openings and valves, and the like, can all be modified without deviating from the scope of the invention.

The foregoing examples do not limit the scope of the disclosed invention. The scope of the disclosed invention is further set forth in the appended claims.

What is claimed is:

1. An induction melting furnace for heating a melt and discharging a metered amount of the melt, the induction melting furnace comprising:

a feed chamber having a sealable supply opening for placing a charge of the melt in the feed chamber and for isolating the interior of the feed chamber from the ambient environment, the feed chamber having a sealable delivery opening;

a melt chamber for heating the melt in the melt chamber, the melt chamber connected directly to the feed chamber by the sealable delivery opening whereby sealing the sealable supply opening of the feed chamber and unsealing the sealable delivery opening of the feed chamber permits the transfer of the charge from the feed chamber to the melt chamber without subjecting the melt in the melt chamber to the ambient environment, the melt chamber having a melt chamber outlet for discharge of the melt;

an at least one induction coil at least partially surrounding the melt chamber;

a meter chamber having a meter chamber inlet and a meter chamber outlet, the meter chamber inlet connected directly to the melt chamber outlet by a connecting passage;

a means for opening and closing the connecting passage to control the flow of the melt through the connecting passage; and a means for opening and closing the meter chamber outlet, whereby opening the connecting passage while the meter chamber outlet is closed fills the meter chamber with the melt, and opening the meter chamber outlet while the meter chamber is filled with melt and the connecting passage is closed discharges a metered amount of the melt from the meter chamber through the meter chamber outlet.

2. The induction melting furnace of claim 1 wherein a magnetic field created by a flow of an ac current in the at least one induction coil inductively heats the melt chamber whereby the heat induced in the melt chamber heats the melt in the melt chamber by conduction.

3. The induction melting furnace of claim 1 wherein a magnetic field created by a flow of an ac current in the at least one induction coil inductively heats the melt in the melt chamber.

4. An induction melting furnace for heating a melt and discharging a metered amount of the melt, the induction melting furnace comprising:

a feed chamber having a sealable supply opening for placing a charge of the melt in the feed chamber, the feed chamber having a sealable delivery opening;

a melt chamber for heating the melt in the melt chamber, the melt chamber connected to the feed chamber by the sealable delivery opening, the melt chamber having a melt chamber outlet for discharge of the melt;

an at least one induction coil at least partially surrounding the melt chamber;

a meter chamber having a meter chamber inlet and a meter chamber outlet, the meter chamber inlet connected to the melt chamber outlet by a connecting passage;

an at least one meter chamber induction coil at least partially surrounding the meter chamber;

a means for opening and closing the connecting passage to control the flow of the melt through the connecting passage; and a means for opening and closing the meter chamber outlet, whereby opening the connecting passage while the meter chamber outlet is closed fills the meter chamber with the melt, and opening the meter chamber outlet while the meter chamber is filled with melt and the connecting passage is closed discharges a metered amount of the melt from the meter chamber through the meter chamber outlet.

5. The induction melting furnace of claim 4 wherein a magnetic field created by a flow of an ac current in the at least one meter chamber induction coil inductively heats the meter chamber whereby the heat induced in the meter chamber heats the melt in the meter chamber by conduction.

6. The induction melting furnace of claim 4 wherein a magnetic field created by a flow of an ac current in the at least one meter chamber induction coil inductively heats the melt in the meter chamber.

7. The induction melting furnace of claim 1 further comprising a gas system whereby a gas can be selectably supplied to or withdrawn from the feed chamber; selectably supplied to the melt chamber; and selectably supplied to or withdrawn from the meter chamber.

8. A method of heating a melt and discharging a metered amount of the melt, the method comprising the steps of:

placing the melt in a melt chamber having a melt chamber outlet;

surrounding the melt chamber at least partially with a one or more induction coils;

flowing an ac current through the one or more induction coils to inductively heat the melt chamber or the melt in the melt chamber;

connecting an inlet of a meter chamber directly to the melt chamber outlet by a melt chamber outlet valve;

connecting an outlet of the meter chamber to a meter chamber outlet valve;

closing the meter chamber outlet valve and opening the melt chamber outlet value to fill the meter chamber with melt from the melt chamber; and closing the melt chamber outlet valve and opening the meter chamber outlet valve to discharge the metered volume of melt in the meter chamber.

9. The method of claim 8 further comprising the step of selectively flowing the ac current through the one or more induction coils to inductively heat selected regions of the melt chamber or melt in the melt chamber.

10. The method of claim 8 further comprising the step of connecting a tuning capacitor in parallel with one of the one or more induction coils to form a passive tank circuit and magnetically coupling the induction coil in the passive tank circuit with at least one of the other one or more induction coils having the ac current flow to induce an induced ac current in the passive tank circuit.

11. A method of heating a melt and discharging a metered amount of the melt, the method comprising the steps of:

placing the melt in a melt chamber having a melt chamber outlet;

surrounding the melt chamber at least partially with a one or more induction coils;

flowing an ac current through the one or more induction coils to inductively heat the melt chamber or the melt in the melt chamber;

connecting an inlet of a meter chamber to the melt chamber outlet by a melt chamber outlet valve;

connecting an outlet of the meter chamber to a meter chamber outlet valve;

closing the meter chamber outlet valve and opening the melt chamber outlet value to fill the meter chamber with melt from the melt chamber;

surrounding the meter chamber at least partially with an at least one meter chamber induction coil and flowing an ac current through the at least one meter chamber induction coil to inductively heat the meter chamber or the melt in the meter chamber; and closing the melt chamber outlet valve and opening the meter chamber outlet valve to discharge the metered volume of melt in the meter chamber.

12. A method of heating a melt and discharging a metered amount of the melt, the method comprising the steps of:

placing the melt in a melt chamber having a melt chamber outlet;

surrounding the melt chamber at least partially with a one or more induction coils;

flowing an ac current through the one or more induction coils to inductively heat the melt chamber or the melt in the melt chamber;

connecting an inlet of a meter chamber to the melt chamber outlet by a melt chamber outlet valve;

connecting an outlet of the meter chamber to a meter chamber outlet valve;

closing the meter chamber outlet valve and opening the melt chamber outlet value to fill the meter chamber with melt from the melt chamber;

closing the melt chamber outlet valve and opening the meter chamber outlet valve to discharge the metered volume of melt in the meter chamber;

injecting the gas into the meter chamber when the melt chamber outlet valve is closed and the meter chamber outlet valve is opened to displace the metered volume of melt discharging from the meter chamber;

withdrawing the gas from the meter chamber when the melt chamber outlet valve is opened and the meter chamber outlet valve is closed to permit filling of the meter chamber with melt from the melt chamber;

placing a charge of the melt in a sealable feed chamber, a feed chamber outlet sealable connected to the melt chamber;

sealing the feed chamber;

delivering the charge to the melt chamber through the feed chamber outlet;

injecting a gas into the volume above the melt in the melt chamber;

injecting the gas into the feed chamber to approximately the same pressure of the gas injected into the volume above the melt in the melt chamber before delivering the charge to the melt chamber; and withdrawing the gas from the feed chamber after delivering the charge to the melt chamber.

13. The method of claim 12 further comprising injecting the gas withdrawn from the meter chamber into the volume above the melt in the melt chamber.

* * * * *